Sept. 14, 1948.   F. W. HOFFER   2,449,297
AUTOMATIC FLUID PRESSURE BALANCING SYSTEM
Filed March 26, 1941   5 Sheets-Sheet 1
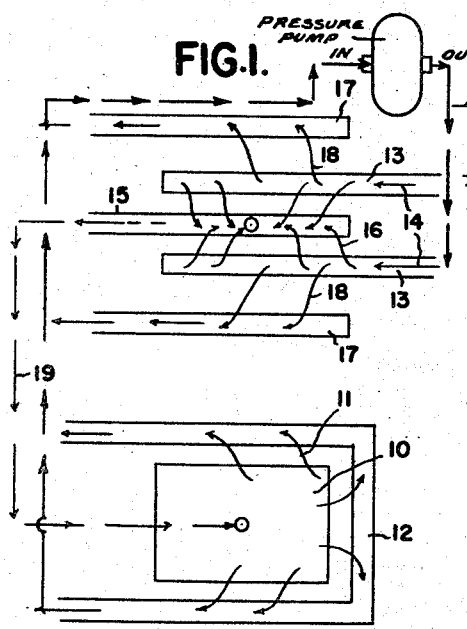
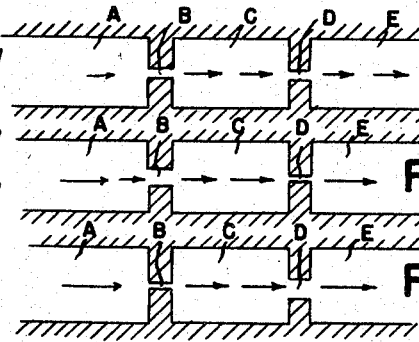
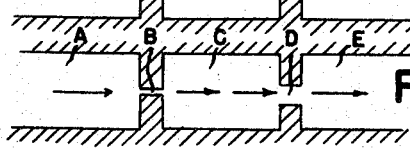
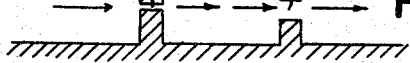
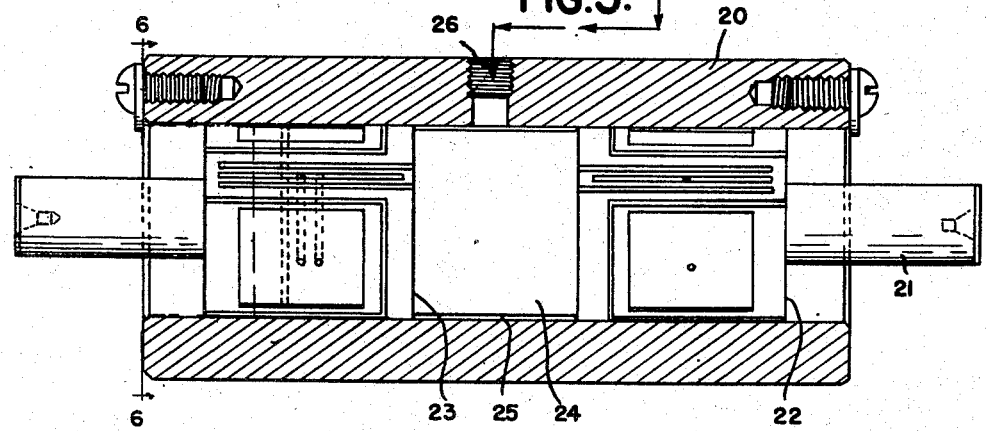
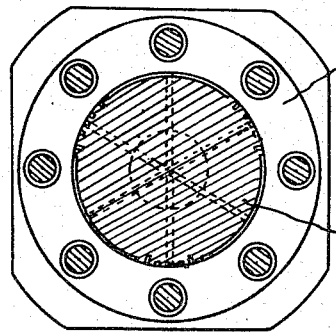
INVENTOR
FRANK W. HOFFER
BY Whittemore, Hulbert
& Belknap ATTORNEYS Sept. 14, 1948.   F. W. HOFFER   2,449,297
AUTOMATIC FLUID PRESSURE BALANCING SYSTEM
Filed March 26, 1941   5 Sheets-Sheet 2

INVENTOR
FRANK W. HOFFER
BY Whittemore, Hulbert
& Belknap   ATTORNEYS

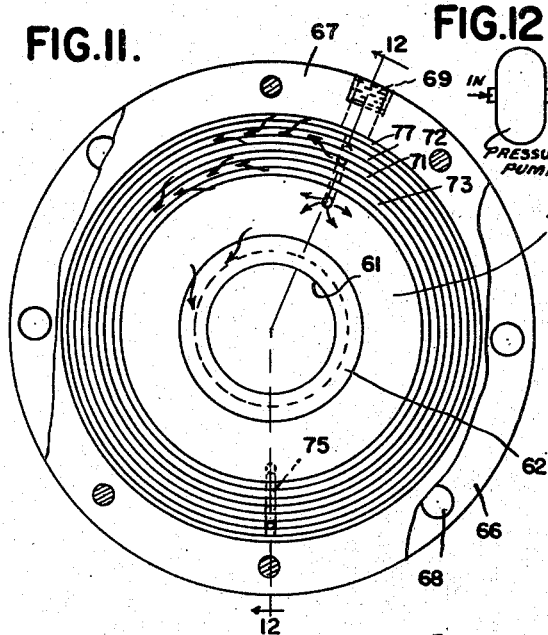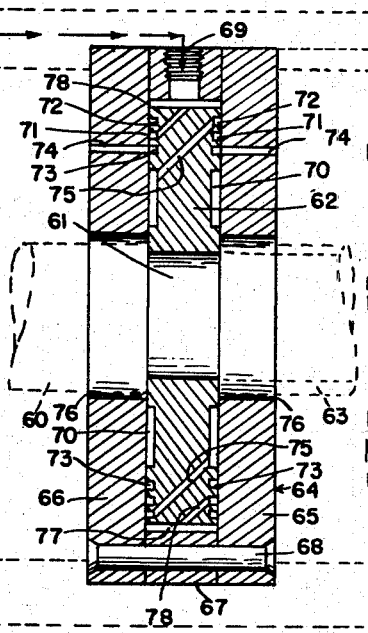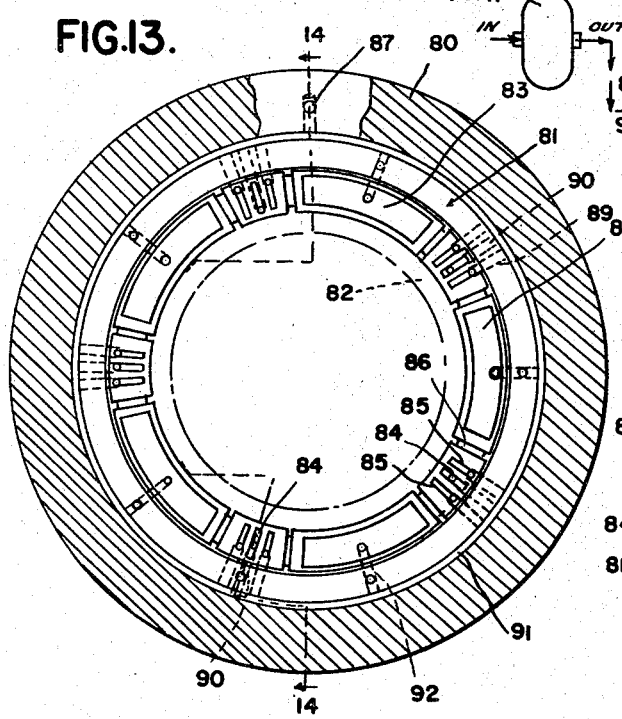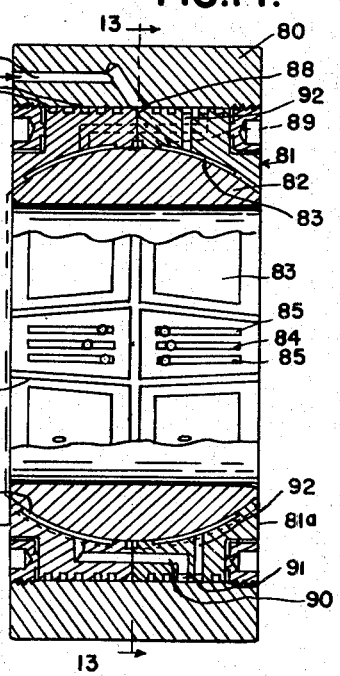

Sept. 14, 1948.  F. W. HOFFER  2,449,297
AUTOMATIC FLUID PRESSURE BALANCING SYSTEM
Filed March 26, 1941  5 Sheets-Sheet 4
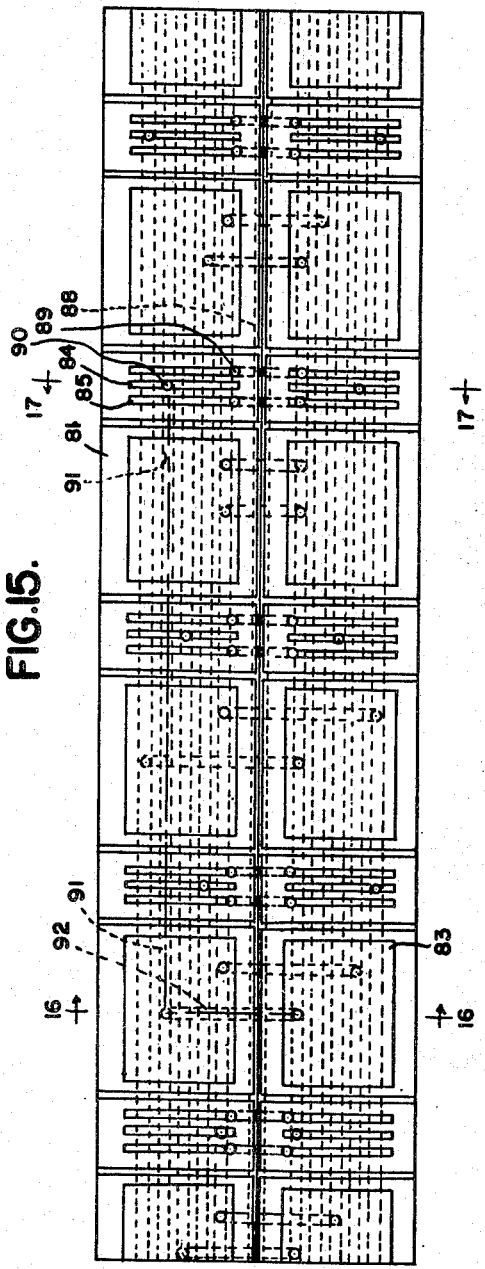
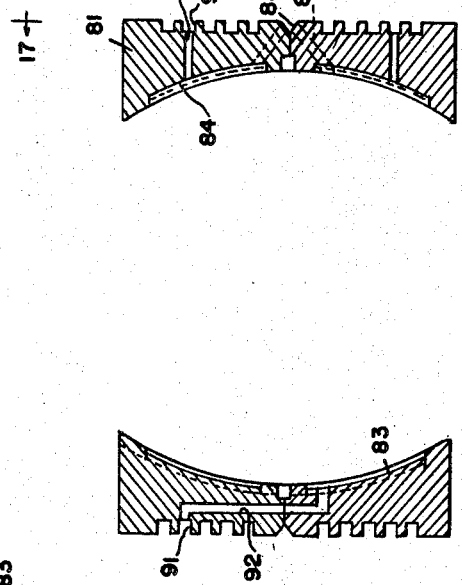
INVENTOR
FRANK W. HOFFER
BY Whittemore, Hulbert
& Belknap
ATTORNEYS Sept. 14, 1948. F. W. HOFFER 2,449,297
AUTOMATIC FLUID PRESSURE BALANCING SYSTEM
Filed March 26, 1941 5 Sheets-Sheet 5

INVENTOR
FRANK W. HOFFER
BY Whittemore, Hulbert
& Belknap ATTORNEYS

Patented Sept. 14, 1948

2,449,297

UNITED STATES PATENT OFFICE 2,449,297

AUTOMATIC FLUID PRESSURE BALANCING SYSTEM

Frank W. Hoffer, Detroit, Mich., assignor, by direct and mesne assignments, to James M. Degnan, Detroit, Mich., as trustee Application March 26, 1941, Serial No. 385,383

15 Claims. (Cl. 308—122)

The present invention relates to an automatic fluid pressure balancing system, and more particularly to a system which employs fluid pressure for "floatably" supporting one member relative to another and out of mechanical engagement therewith.

The present invention teaches new principles and constructions for connections, or bearings, between a pair of relatively movable members, in which clearances filled with fluid under pressure are automatically maintained between the members. In the case of bearings or members confined between portions of another member at opposite sides thereof, the total clearance existing is determined by the dimensions of the parts. Relative movement of the floating member under load toward or away from a portion of the other member reduces the instantaneous clearance at the side toward which the load acts, giving rise to a clearance between the complementary surfaces of said members at the side of said floating member which is referred to herein as instantaneous supporting clearance. Since the floating member is positioned by fluid pressure acting at opposite sides which automatically tends to maintain the floating member spaced out of contact with said other member, and since the pressure of the fluid is automatically varied in accordance with the spacing of said floating member, the floating member will yield under load toward contact on one side thereof an amount sufficient to produce compensating changes in fluid pressure. The members are thus held in relative fluid suspension, one member being "floatably" mounted in the other, so that in the absence of external loading the free floating member is automatically positioned to maintain constant supporting clearance with the other member, or identical or predetermined percentage of total clearance between cooperating sets of complementary surfaces, the said cooperative sets being at opposite sides of the floating member. Upon application of external load the relative position of the members is altered slightly in a manner to decrease the supporting clearance between said members, or to decrease the instantaneous supporting clearance on one side of the floating member and increase the clearance on the opposite side. These changes in clearances automatically result in changes of fluid pressures exerted between the members in a manner to automatically maintain stable equilibrium between external loading and internal fluid pressures.

While the present invention is capable of numerous and diverse applications, it may be illustrated and described more conveniently in connection with bearings, and accordingly in this application I have chosen the bearings as a specific embodiment of the present invention. It will be understood that this specific disclosure of one application of my invention is not intended to be limiting but is made solely to enable those skilled in the art to practice the invention.

Very briefly described, the present invention involves providing means intermediate a pair of members which are relatively movable in a sense which operates to vary the instantaneous clearance between at least portions of complementary surfaces of said members for partially confining fluid under pressure. The clearance at one side of the float member will be a predetermined percentage of the total clearance between said members. A continuous flow of fluid under pressure is supplied to the space between the complementary surfaces. Means are provided which are automatically operated by variations in the spacing for controlling the pressure of partially confined fluid. In some instances the pressure of the partially confined fluid is controlled by variably restricting the outlet flow of fluid therefrom. In other cases the pressure of a partially confined fluid is controlled by variably restricting both the inlet flow of fluid to the space referred to, and the outlet flow of fluid from the space referred to.

The variations in the restriction or restrictions referred to is accomplished by employing the clearance between the members as variably restricting orifices for the flow of fluid, either from, or both from and to the partially confined, pressure or balancing zones, whereby the restriction afforded by these orifices is variable in accordance with variations in spacing between said members.

Means are provided, herein referred to as isolating means, for limiting the area or areas throughout which the balancing pressure can extend. As applied to bearings, the present invention may be employed in cylindrical bearings, spherical bearings, thrust bearings, slides and the like.

With the foregoing general remarks in mind, it is an object of the present invention to provide means for controlling the spacing of a member in its manufactured clearance relative to another member by fluid under pressure.

It is a further object of the present invention to maintain two members positively spaced by fluid pressure means resisting loads tending to move them into engagement.

It is a further object of the invention to provide means for spacing a pair of members which comprises means for partially confining a body or bodies of fluid under pressure between said members and for varying the pressure of the partially confined fluid in accordance with loads imposed on the members.

It is a further object of the invention to provide a body or bodies of partially confined fluid under pressure between complementary surfaces of a pair of relatively movable members and varying the pressure of the body or bodies of fluid by variably restricting the outlet flow of fluid from said body or bodies.

It is a further object of the invention to provide a body or bodies of partially confined fluid under pressure between complementary surfaces of a pair of relatively movable members and varying the pressure of the body of fluid by variably restricting the inlet flow of fluid to said body or bodies, and simultaneously variably restricting the outlet flow of fluid from said body or bodies.

Other objects of the invention will be apparent as the description proceeds, and when taken in conjunction with the accompanying drawings, wherein:

Figure 1 is a diagram illustrating the essential elements of a preferred form of my invention;

Figures 2 to 4 are diagrams illustrating the principles of fluid pressure control involved;

Figure 5 is a side elevation, partly in section, of a cylindrical bearing constructed in accordance with the present invention;

Figure 6 is a section on the line 6—6, Figure 5;

Figure 11 is an end elevation of a bearing illustrating a somewhat different embodiment of my invention, with parts broken away;

Figure 12 is a section on the line 12—12, Figure 11;

Figure 13 is an end elevation of a somewhat different embodiment of my invention, with parts broken away, and partly sectioned on the line 13—13, Figure 14;

Figure 14 is a section on the line 14—14, Figure 13;

Figure 15 is a development of the bearing surface of the bearing shown in Figure 13;

Figure 16 is a section on the line 16—16, Figure 15;

Figure 17 is a section on the line 17—17, Figure 15;

Figure 8:
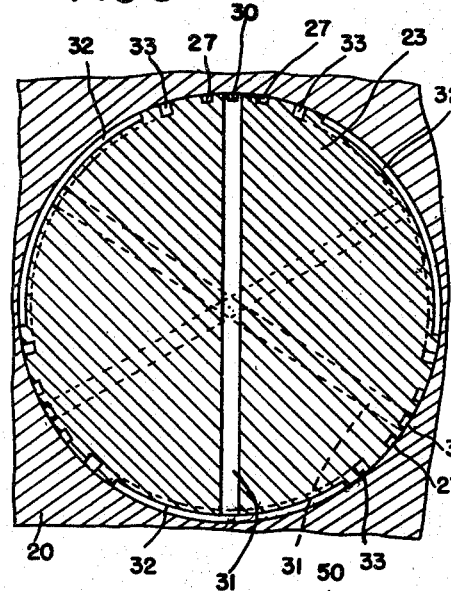
Figure 8 is a section on the line 8—8, Figure 7.

Referring first to Figures 1 to 4, I have illustrated some of the principles involved in the present invention.

In the case where a member is supported for relative movement between a pair of opposed surfaces, the balancing means takes the form of a plurality of balancing systems, one of which is diagrammatically illustrated in Figure 1. The balancing system comprises a balancing or pressure area, or zone, indicated at 10. The zone 10 is located between a pair of complementary opposed surfaces and is conveniently formed by forming a shallow recess in one of said surfaces. The spacing between the two surfaces permits restricted outflow of fluid under pressure from the zone 10, as indicated by the arrows 11, and in order to limit the area of pressure application, isolating means 12 are provided. The isolating means 12 may conveniently take the form of a groove substantially surrounding the balancing or pressure zone 10, and adapted to provide for a discharge of the fluid which passes from the zone 10 to the groove 12, to atmosphere or to a point of lower pressure.

The fluid between the complementary surfaces between area 10 and isolation groove 12 has a film pressure gradient the pressure of which grades from the pressure in area 10 to the pressure in groove 12, which extends the effective balancing area somewhat beyond that defined by the periphery of area 10. This extension is limited by the spacing of isolating grooves about the balancing area.

The spacing between the complementary surfaces adjacent the pressure areas 10 and isolation grooves 12, and also the length of "seals" therebetween, provide a restriction against flow of fluid from the areas 10 to the grooves 12.

At the opposite side of the floating, relatively movable member, I provide means for controlling the flow of fluid under pressure to the balancing zone. This means takes the form of one or more feed areas 13, which may conveniently be formed by providing grooves in one of the opposed surfaces at the opposite side of the floating member from the balancing zone 10. Fluid under pressure is admitted to the grooves 13, as indicated by the arrows 14. Adjacent the feed grooves 13 I provide a reduction area 15, which may conveniently take the form of a shallow groove formed in the surface of the same member provided with the grooves 13. The spacing between the surfaces of the members and also the length of "seals" between feed and reduction grooves, provide a restriction against the flow of fluid from the grooves 13 to the reduction groove 15, this flow being indicated by the arrow 16. In accordance with well understood principles, the pressure of the fluid in the reduction zone 15 will be reduced from the pressure of the fluid in the feed grooves 13.

In order to prevent the application of elevated fluid pressure over undesirably large areas, I provide isolating means 17, which may conveniently take the form of outlet grooves formed in the same surface provided with the grooves 13 and 15. Due to the spacing between the surfaces referred to, there will be a continuous flow of fluid from the grooves 13 to the grooves 17, as indicated by the arrows 18. In this figure I have indicated the spacing between the feed grooves 13 and the isolating grooves 17 as somewhat greater than the spacing between the feed grooves 13 and the reduction groove 15.

Means are provided for conducting fluid at the pressure existing in the reduction groove 15 to the balancing zone 10, and diagrammatically in Figure 1 I have indicated the unrestricted flow of fluid from the reduction groove 15 to the balancing zone 10 by the arrows 19.

Referring now to Figures 2 to 4, the principles governing the pressures of the fluid at the various grooves and zones will be described. In Figure 2 I have indicated at A a supply of fluid under pressure, such as exists within the feed grooves 13. At B I indicate a restriction orifice corresponding to the restriction formed by the spacing, and the length of "seal" between the cooperating surfaces intermediate the feed grooves 13 and the reduction groove 15. At C I indicate a supply of fluid under a reduced pressure, such as exists within the reduction groove 15 and the pressure or balancing zone 10 communicating therewith. At D I indicate a restriction orifice in the outlet of fluid from the pressure zone 10, such as is formed by the spacing and length of "seal" between the cooperating surfaces intermediate the pressure zone 10 and the isolating groove 12. At E I indicate the outlet means for fluid discharged from the pressure zone 10, which corresponds to the isolating groove 12.

If we assume for example, that the floating member is under no load and is therefore supported equidistant from the two opposed surfaces between which it is located, the restrictions afforded by the orifices B and D will be substantially equal. If then it is assumed that the fluid in the space A (supply grooves 13) is under a pressure of 5000 pounds per square inch, and if the outlet as indicated at E (the isolating grooves 12) is under atmospheric pressure, the pressure in the zone C (the balancing or pressure zone 10) will be 2500 pounds per square inch.

The rate of fluid flow through orifice B is identical with that through orifice D. Therefore the pressure drop through orifice B will be identical with that through orifice D.

If now a load is applied to the floating member in a direction to decrease the space between the complementary surfaces adjacent the balancing zone 10, making this the supporting clearance, and to correspondingly increase the spacing between the complementary surfaces adjacent the feed grooves 13 and the reduction groove 15, a condition illustrated in Figure 3 will exist. Under these circumstances, the cross-section of orifice D, previously described, is reduced and the cross-section of orifice B is correspondingly increased. Under these circumstances and in accordance with well-known physical laws, the pressure in the balancing zone C will increase. If the relative motion between the members is sufficient to completely or substantially completely close the orifice D, the pressure in the space C will increase to nearly the supply pressure, which was said to be 5000 pounds per square inch. This increased pressure in the zone C acts in a direction tending to move the floating member toward its unloaded position, and if the load imposed upon the floating member is within the capacity of the device, the floating member will assume a new position in which a condition of static balance exists, and in which the floating member is supported solely by a body or bodies of fluid under pressure in the zone or zones 10. It will be readily apparent that the amount of displacement of the floating member under a given load will vary inversely in accordance with the pressure supplied in the feed grooves 13.

In Figure 4 I have illustrated the condition which exists if the load were applied to the floating member in the opposite direction, such that the spacing between the complementary surface adjacent the feed grooves 13 and reduction groove 15 is reduced, and the spacing between the complementary surfaces adjacent the pressure zone 10 and the isolating grooves 12 is increased. Under these circumstances, the pressure in the zone 10 will be decreased an amount dependent on the variation in spacing. If the load is such as to reduce the spacing between the complementary surfaces adjacent the feed grooves 13 and reduction groove 15 to zero or substantially to zero, the pressure in the zone C (zone 10) will become substantially atmospheric, or that of the isolating grooves.

Ordinarily a plurality of systems such as shown in Figure 1 are provided. For example, in the case of a cylindrical bearing, preferably at least three such balancing areas will be provided spaced about the circumference of the bearing. The pressure in each of the balancing zones such as 10, will automatically be controlled in a manner to balance the load imposed on the relatively movable member so as to keep the two members out of mechanical engagement with each other.

In Figures 5 to 8 I have illustrated a cylindrical bearing comprising a sleeve 20 in which is mounted a rotatable member 21. The rotatable member 21 has a pair of spaced, balancing or bearing portions 22 and 23, separated by a reduced portion 24 providing an intermediate space 25. A tapped connection 26 is provided to which suitable conduit means (not shown) may be connected for supplying a continuous flow of fluid under pressure to the space 25.

The portions 22 and 23 of the member 21 are of a size somewhat smaller in diameter than the bore of the sleeve 20 so that the member 21 is mounted within the sleeve 20 for a slight relative movement in a transverse or radial direction, as well as for rotation and axial relative movement.

According to this embodiment of my invention, the pressure zones, the isolating grooves, the reduction grooves, and the feed grooves are formed in the enlarged portions 22 and 23 of the member 21. It may be stated at this time that where the relative movable members are mounted for relative rotation, the grooves and pressure or balancing zones referred to are preferably located in the member which is not rotatable. This is not necessarily so however, and in the embodiment now being described these grooves and areas are located in the rotatable member 21.

Figure 7:
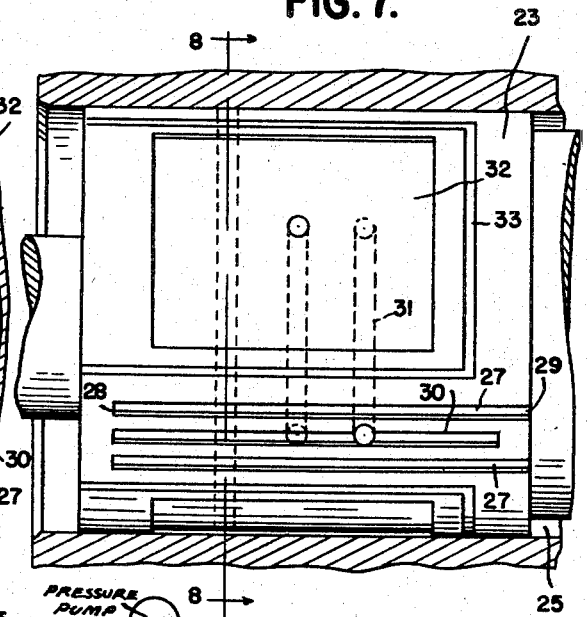
Figure 7 is an enlarged vertical elevation, partly in section, of one end of the bearing shown in Figure 5.

Referring particularly to Figures 7 and 8, which show the construction of the enlarged portion 23 on an enlarged scale, I have illustrated a pair of feed or supply grooves 27 which are closed at the ends 28 but which open at their ends 29 into the space 25. Intermediate a pair of feed grooves is a reduction groove 30, which is closed at both ends as indicated in Figure 7.

The reduction groove 30 has one or more passages 31 which communicate with a pressure zone 32 defined by a shallow recess of relatively large area located in the portion 23 diametrically opposite to the reduction groove 30.

Surrounding three sides of the pressure zone 32 is an isolating groove 33 which communicates to atmosphere at the end of the portion 23 away from the space 25.

As best seen in Figure 8, I have indicated three balancing zones 32 together with their associated grooves and passages. It will be observed that a set of feed grooves and reduction grooves is located intermediate a pair of pressure or balancing zones 32, and that therefore intermediate each feed groove 27 and the adjacent pressure or balancing zone 32, there is located an isolating groove 33 which prevents the pressure available in the feed grooves 27 and/or the reduction groove 30 from being communicated to the adjacent balancing zone 32.

As well illustrated in Figure 8, if a load is imposed downwardly on the portion 23, the pressures in the balancing zones 32 will be modified so as to bring about a condition of static balance. Fluid under the supply pressure is available in the grooves 27. If the portion 23 is moved downwardly in a manner to increase the clearance between the surfaces of the portion 23 and the member 20 adjacent the upper set of grooves 27 and 30, the effective restriction between the feed grooves 27 and the reduction grooves 30 is decreased so that the pressure of the fluid in the passage 31 and in the bottom pressure zone 32 communicating therewith, will increase. At the same time, downward movement of the portion 23 relative to the sleeve 20 will decrease the spacing between the surfaces of the portion 23 and the sleeve 20 adjacent the bottom of the portion 23 and intermediate the lowermost pressure or balancing zone 32 and the isolating groove 33 cooperating therewith. This increases the restriction to the flow of fluid from the balancing zone 32 to atmospheric or reduced pressure through the isolating groove 33. This has the effect of further increasing the pressure in the balancing zone 32. It will be appreciated that this increase of pressure in the balancing zone 32 is in a direction to resist the downward load imposed on the portion 23, and will bring about a condition of static balance while the member 23 is still out of mechanical contact with the lower portion of the sleeve 20 whether the members are at rest or in relative motion.

At the same time the pressure of the fluid in the two uppermost balancing zones 32, as seen in Figure 8, will be decreased by reason of the increased restriction to flow of fluid from the feed grooves 27 to the reduction grooves 30 cooperating therewith.

From the foregoing it will be seen that the arrangement just described provides means which will automatically effect variations in the pressure of partially confined bodies of fluid under pressure in a manner to resist relative transverse or radial movement between the members, and in a manner to provide a resultant fluid pressure equal and opposite to any external loads imposed.

Figure 9:
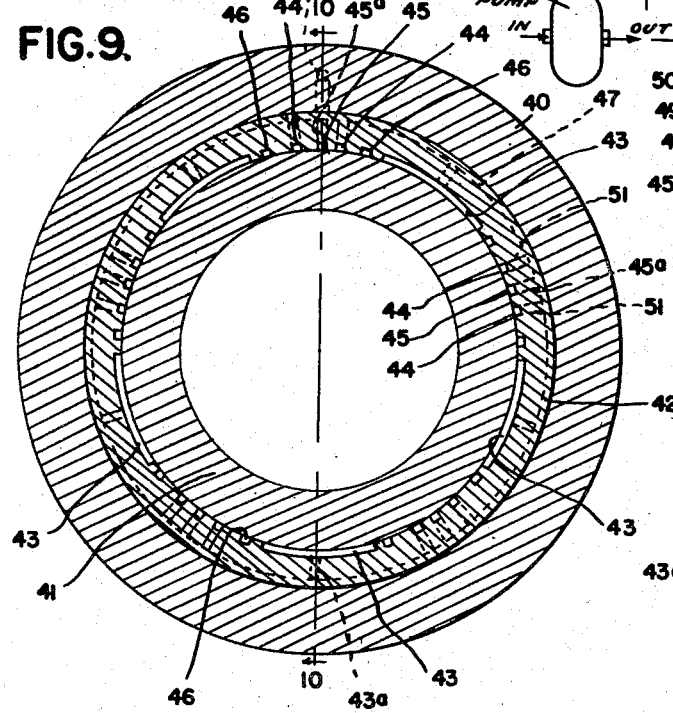
Figure 9 is a transverse section through a bearing illustrating another embodiment of my invention.
Figure 10:
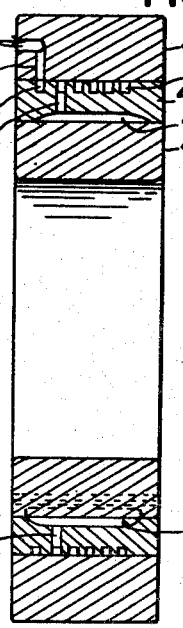
Figure 10 is a section on the line 10—10, Figure 9.

Referring now to Figures 9 and 10, I have illustrated a somewhat different arrangement which, however, operates on exactly the same principles. According to this embodiment of my invention, I provide a sleeve 40 in which is rotatably mounted cylindrical float member 41. Intermediate the sleeve 40 and member 41 I provide a balancing member 42 which is adapted to support the float member 41 solely by automatically controlled fluid pressures.

According to this embodiment of my invention, this structure may be designed to be dimensionably interchangeable with conventional roller or ball bearings.

This embodiment of my invention illustrates the preferred arrangement in which the various balancing areas, grooves and passages making up my improved balancing system are provided in a relatively stationary member to cooperate with a relatively rotatable member.

In this embodiment of my invention I have illustrated five pressure or balancing zones 43, which are shown equally spaced circumferentially around the balancing member 42. Intermediate each pair of balancing zones 43 I provide a pair of feed grooves 44 and a reduction groove 45 which is adapted to communicate with the pressure zone 43 diametrically opposite thereto. Each of the balancing zones 43, as in the embodiment previously described, are provided with isolating grooves 46 which communicate with pressure external to said members. The pressure of fluid in the isolating grooves must always be lower than the pressure of fluid in the feed grooves.

In the present embodiment of my invention, unrestricted communication between a reduction groove 45 and the diametrically opposite, cooperating pressure zone 43 is established by circumferential grooves 47, five of which are provided, one for each of the pressure zones 43 illustrated. Communication between a reduction groove 45 and the cooperating circumferential groove 47 is established by a bored passage 45a, and in like manner communication between the circumferential groove 47 and the pressure zone 43 is established by a bored passage 43a. Another circumferential groove 48 is provided which communicates through a passage 49 to an opening 50 which is adapted to be connected by suitable conduit means to a source of fluid under pressure. The groove 48 communicates with the feed grooves 44 by drilled passages 51.

The operation of this embodiment of my invention is substantially identical with that previously described, but for completeness will be briefly reviewed.

If it is assumed that a load is applied to the floating member 41 in a downward direction as seen in Figure 9, the member 41 will move downwardly in a manner to increase the space between the exterior surfaces of the member 41 and the internal surfaces of the balancing member 42 at the upper side of the floating member, and intermediate the upper set of feed grooves 44 and the reduction groove 45. The feed grooves 44 are always completely filled with fluid under the supply pressure, and this increase of space between the surfaces referred to reduces the restriction to flow of fluid from the feed grooves 44 to the reduction groove 45. This reduction in the restriction to flow results in an increase in the pressure of the fluid in the reduction groove 45 and, accordingly, results in a corresponding increase of the pressure of the fluid in the passage 45a, associated groove 47, the passage 43a and the lowermost balancing area 43 in communication therewith. At the same time, downward movement of the floating member 41 under the load referred to reduces the supporting clearance between the external surface of the member 41 and the internal surface of the balancing member 42 at the lower side of the floating member. This decrease in the supporting clearance referred to results in an increase in the restriction to flow of fluid from the balancing zone 43 to the isolating grooves 46 adjacent thereto.

The increase in the restriction to the outlet flow of fluid from the balancing zone 43 acts in a manner to further increase the pressure of the fluid partially confined in said balancing zone which pressure, in turn, exerts an upward balancing force on the member 41. In like manner the other two balancing areas 43, which are in open communication with the lower half of the member 41, have a corresponding but lesser increase in pressure, tending to balance the load applied. In like manner the pressure of the fluid in the two balancing areas 43, which are in open communication with the upper half of the member 41, is somewhat reduced, and this reduction of counterbalancing pressure assists the lower balancing areas in balancing the load applied.

A somewhat different embodiment of my invention is illustrated in Figures 11 and 12. In these figures I have illustrated my invention as applied to a thrust bearing adapted to counterbalance a thrust developed axially of a rotating shaft 60. As shown in this figure, the shaft 60 has a reduced portion 61 on which is seated a balancing or float member 62, retained against axial displacement on the shaft 60 by means of a locking member 63. Shaft 60 retains the balancing or boat member 62 in parallelism with the complementary surfaces of plates 65 and 66. The balancing member 62 is rotatable within a cylindrical housing 64 composed of plates 65 and 66, and an annular member 67 assembled in sealed relation by suitable means such as the rivets 68. The housing 64 is tapped as indicated at 69, which connects with a conduit adapted to supply a continuous flow of fluid under pressure.

In the embodiment illustrated, I have indicated the annular recesses defining the balancing zones or areas and the cooperating grooves as formed in the rotating balancing member 62, but it will be appreciated that if preferred the balancing areas and grooves could be provided with equal facility in the interior surfaces of the housing 64.

Balancing member 62 is provided with annular balancing recesses 70. Spaced radially outwardly beyond the annular balancing recesses 70 are a plurality of grooves. These grooves are an isolating groove 73, a feed groove 71, and a reduction groove 72, in order. Isolating groove 73 is in registry with an outlet passage 74. A reduction groove 72, at one side of the balancing member 62, is connected by means of passages 75 with the annular balancing zone 70 at the opposite side of the balancing member 62.

The inner edge of the annular balancing zone 70, at each side of the balancing member 62, is spaced radially outwardly a short distance beyond the bore 76 of plates 65 and 66. The bore 76 is somewhat larger than the shaft 60 so as to provide substantially unrestricted flow of fluid through the space therebetween from the annular balancing zones 70.

It will be appreciated that the cooperating balancing systems shown in Figures 11 and 12 are intended to counterbalance axial loads only, and are not effective to counterbalance radial loads.

The theory of operation of the construction illustrated in these figures is broadly the same as those previously described, but for completeness it will be reviewed briefly.

Fluid under pressure is admitted through the tapped opening 69 and completely fills the annular space 77 between annular member 67 and the peripheral edge of the balancing member 62. Fluid is admitted from the space 77 to the feed grooves 71 through passages 78 which are provided in sufficient number so that the feed grooves 71 are at all times completely filled with fluid under pressure.

Under no load conditions, the balancing member 62 will be approximately equally spaced from the plates 65 and 66, and accordingly there will be approximately equal restrictions to flow of fluid both to and from the balancing zones 70 at opposite sides of the balancing member 62. Under these conditions, fluid will flow from the annular space 77 and from the feed grooves 71 to the reduction grooves 72 at opposite sides of the balancing member 62. The drop of fluid pressure through the orifices between annular space 77 and feed grooves 71 to reduction grooves 72 at opposite sides of the balancing member 62 will therefore be equal. The fluid under pressure in the reduction grooves 72 will flow through the passages 75 to the balancing zones 70 at opposite sides of the balancing member 62. Since the balancing member 62 is equally spaced between the plates 65 and 66, there will be equal restriction to flow of fluid out of the balancing zones and, accordingly, the pressure of the fluid in the balancing zones at opposite sides of the balancing member will be equal. Fluid under pressure in the balancing zones 70 will flow outwardly therefrom to the isolating grooves 73, and also outwardly through the space provided between the shaft 60 and the bore 76.

If now a load is imposed upon the shaft 60, tending to move the same to the right as seen in Figure 12, the balancing member 62 will move slightly to the right and this yielding or change of position will decrease the supporting clearance between the side surface of the member 62 and the adjacent inner surface of the plate 65. This will have the effect of increasing the restriction to flow of fluid from the annular space 77 and from the feed groove 71 to the reduction groove 72, at the right of balancing member 62, and will accordingly result in a drop in pressure in the annular balancing zone 70 located at the left side of the balancing member 62, as seen in Figure 12. At the same time, movement of the balancing member 62 to the right as seen in this figure, will decrease the restriction to outlet flow of fluid from the left-hand balancing zone 70 to the isolating groove 73, and to the clearance spacing existing between the shaft 60 and the bore 76 in the left-hand plate 66. This reduction in the restriction to flow of fluid will result in a further decrease in pressure of the fluid contained in the left-hand balancing zone 70.

At the same time, movement of the balancing member 62 to the right as seen in Figure 12, will decrease the restriction against flow of fluid from the annular space 77, and from the feed groove 71 to the reduction groove 72 located at the left side of the balancing member 62. This will result in an increase in the pressure of the fluid supplied through the connecting passage 75 and in the balancing zone located at the right-hand side of the balancing member 62. In like manner, this movement of the balancing member 62 will increase the restriction against flow of fluid out of the right-hand balancing zone 70, both to the isolating groove 73 and to the clearance existing between the locking member 63 and the bore 76 provided in the plate 65. This will have the effect of further building up the pressure in the right-hand balancing zone 70 in a manner to resist the load to the right imposed upon the shaft 60. The increase in pressure of the right-hand balancing zone 70, accompanied by the decrease in pressure in the left-hand balancing zone 70, will provide a resultant fluid pressure effective on the balancing member 62 which will exactly counterbalance the load imposed while maintaining the balancing member 62 out of mechanical contact with the walls of the housing 64 whether said members are in motion or at rest.

In Figures 13 to 17, I have illustrated yet another embodiment of my invention. In these figures I have illustrated the invention as applied to a spherical bearing, and the arrangement is such that the pressure of bodies of partially confined fluid will be modified in accordance with loads imposed which tend to produce relative movement between the parts. In these figures I have indicated at 80 a sleeve having a cylindrical bore in which is adapted to be seated a balancing member 81, which has a generally spherical inner surface so as to cooperate with a relatively movable float member 82 whose complementary exterior surface is spherical.

Balancing member 81 in this embodiment is made up of two parts 81a and 81b. Each of the members 81a and 81b is provided with a plurality of shallow recesses defining balancing zones 83. As seen in Figure 13, each of the members 81a and 81b is provided with five of the balancing zones 83 so that the assembly provides a total of ten of such balancing zones. Intermediate each of the balancing zones 83 I provide a reduction groove 84 and a pair of feed grooves 85. Surrounding each of said balancing zones 83 on three sides, and isolating the same from the feed and reduction grooves, I provide isolating grooves 86.

Passages indicated at 87 are provided in the sleeve 80 for connection by suitable means to a supply of fluid under pressure, and the exterior surface of the balancing structure 81 is provided with a groove 88 which extends completely around the assembly. As shown in Figure 14 the groove 88 is conveniently formed by chamfering the inner corners of the members 81a and 81b. A suitable number of the passages indicated 89 are provided which connect the groove 88 with the feed grooves 85 previously described.

Each of the reduction grooves 84 is provided with a bore 90 which communicates with a single one of a plurality of grooves 91 formed in the outer periphery of the structure 81. Each of the grooves 91 is also provided with a passage, such as indicated at 92, communicating with a corresponding one of the pressure or balancing zones 83. The arrangement is such that a reduction groove 84 is connected by passage 90, a groove 91, and passage 92 with the pressure or balancing zone 83 diametrically opposite thereto. Thus, for example, the reduction groove 84 shown adjacent the lower left-hand corner of Figure 14 connects by passage 90 shown in full lines, the communicating groove 91, and the passage 92 shown in full lines adjacent the upper right-hand corner of the figure, with the pressure or balancing zone 83 adjacent the upper right-hand corner of Figure 14.

As seen in the embodiment illustrated in these figures, there are ten separate balancing zones. It is necessary to provide ten of the annular grooves 91 in order to connect each of said balancing zones with its corresponding reduction groove.

In Figure 15 I have shown a development of the balancing member 81 shown in Figure 14, and in this figure I have traced by dot-and-dash lines the passage of fluid to and from one of said balancing areas, and I have applied reference numerals only to such of said passages as form a part of a single balancing system. By a single balancing system I refer to a single pressure or balancing area or zone and its associated feed, reduction and isolating grooves, and connecting passages. Fluid is at all times present under pressure in the external feed groove 88 and passes through the passages 89 to the feed grooves 85. Fluid from the feed grooves 85 passes through the restriction afforded by the contiguous inner surface of the balancing member 81 and the cylindrical surface of the member 82, to the reduction groove 84. The reduction groove 84 communicates through a passage 90 with groove 91. Groove 91 extends completely around the external circumference of the balancing structure 81, and the fluid flows both ways through the groove 91 from the passage 90 to a second passage 92 which communicates with the balancing zone 83.

It will thus be seen that fluid from the reduction groove 84 is admitted to the cooperating balancing zone 83 which is diametrically opposite thereto. The balancing zone 83 is removed from reduction groove 84 by 180° in circumference and is located on the opposite side of the median plane of the assembly.

The operation of this embodiment of my invention is the same in principle as that of those previously described. Relative displacement of the inner float member 82 in any direction under an external load results in variation in pressure in the various balancing zones such as to produce a resultant fluid pressure equal and opposite to the imposed load. Under any imposed load within the capacity of the device, the float member assumes a new position which so modifies the pressure acting thereon as to support the float member in its new position and out of mechanical contact with the balancing member, whether said members are at rest or in relative rotation.

Figure 18:
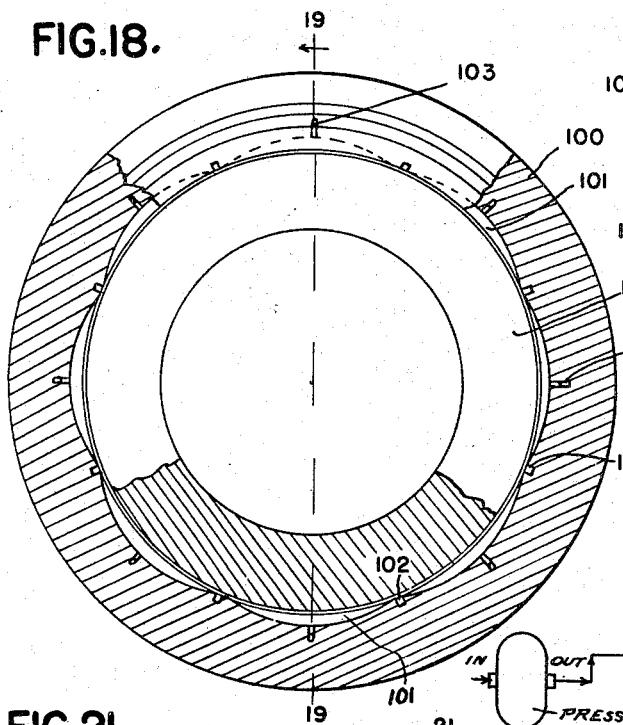
Figure 18 is an end elevation, partly in section, of a somewhat different embodiment of my invention.
Figure 19:
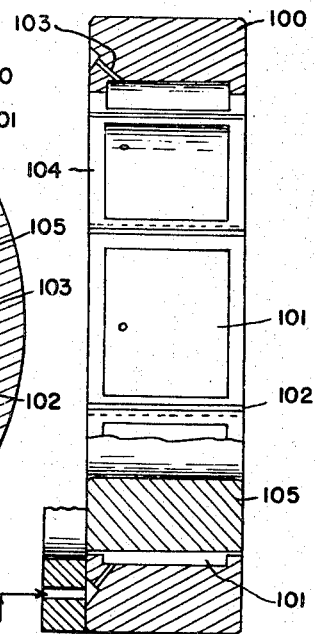
Figure 19 is a section on the line 19—19 of Figure 18, with parts broken away.

Referring now to Figures 18 and 19, I have illustrated a somewhat simplified form of structure which is nevertheless adapted to conform to principles above outlined. In this case, a sleeve member 100 is provided with a plurality of recesses 101 defining pressure or balancing zones. Intermediate the recesses 101 the inner periphery of the sleeve 100 is provided with isolating grooves 102. Each of the zones 101 has communicating therewith a restriction orifice 103 through which fluid under pressure is admitted, and this fluid under pressure is partially confined in the zone 101 by the peripheries of the recesses 101 which, as indicated in Figure 19, are closed at their ends as indicated by the numeral 104. The outer surface of the float member 105 is slightly less than the inside diameter of sleeve 100, so as to permit a restricted flow of fluid out of pressure zones 101 and sufficient clearance exists so that the float member is relatively movable in a radial direction with respect to the sleeve member 100.

For maximum load carrying capacity per square inch of bearing area, it is desirable to proportion the inlet restriction 103 approximately equal to the outlet restriction formed by the clearance between complementary surfaces with the float member 105 in the position of identical clearance at opposite sides. This permits controlled variation in pressure in the balancing areas from pressure nearly equal to the supply pressure to pressures approaching the external pressure.

With the parts as shown in Figure 18 and with no load imposed upon the float member 105, this member will be uniformly spaced at all sides from the sleeve 100. Fluid under pressure is admitted through orifices 103 and exerts a balancing pressure on the member 105. Fluid escapes from the zones 101 by reason of the clearances existing between the parts and enters the isolating grooves 102, from two sides of zones 101, and from the other two sides direct. If now a radial load is imposed upon the member 105, as for example in a downward direction as seen in Figure 18, float member 105 moves down to a new position. In this new position the flow of fluid from the lowermost pressure zone 101 is additionally restricted by reason of the diminished supporting clearance existing between the complementary surfaces at the lower side of float member 105. This increase in the restriction of outlet flow of fluid results in an increase in the pressure built up in the pressure zones 101 at the lower part of float member 105. At the same time downward movement of the float member 105 results in increased clearance and consequently less restriction to outlet flow of fluid from the pressure zones 101 at the upper part of float member 105, which results in a decrease in the effective pressure of the fluid partially confined in the balancing zones at the upper part of float member 105. The resultant pressure developed is sufficient to produce a state of static balance of the inner member, whether the same is stationary or rotating.

It will be observed that in the embodiment just described the control of the pressure in the pressure zones is effected solely by automatic variations in the outlet restrictions relative to properly proportioned inlet restrictions. In the modifications previously described, the variation of the pressure of the fluid in the pressure zones was modified by automatically varying restrictions in both the inlet to, and the outlet from, the pressure zones.

Figure 21:
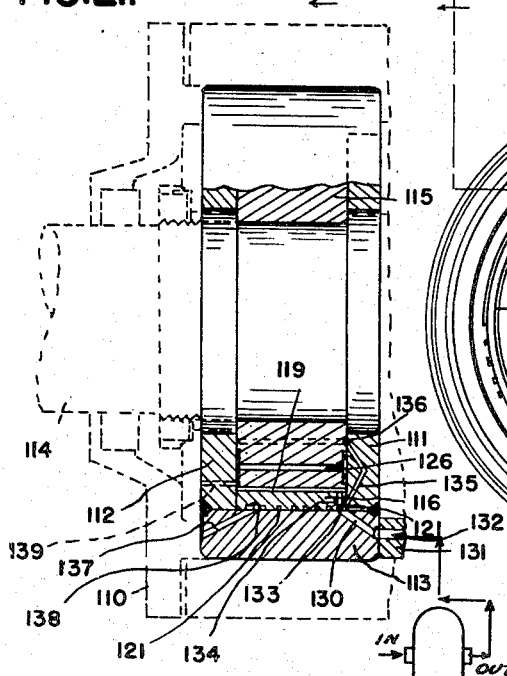
Figure 21 is a section on the line 21—21 of Figure 20 showing the supporting structure therefor in dotted lines.
Figure 20:
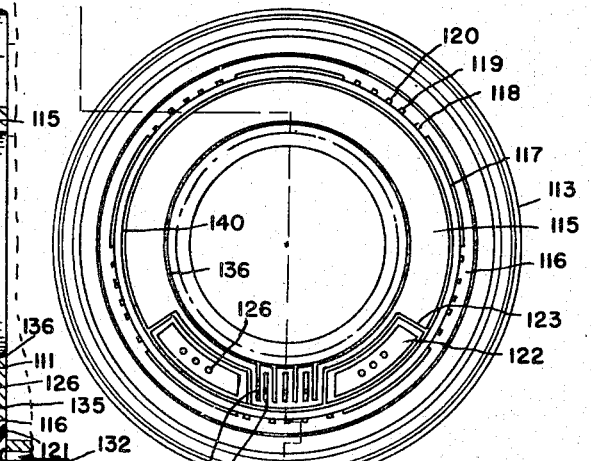
Figure 20 is an end elevation, partly in section, of a somewhat different embodiment of my invention.

In Figures 20 and 21 I have illustrated a somewhat different embodiment of my invention in which balancing systems are arranged to balance axial loads, or radial loads, or both. In these figures I have indicated at 110 in Figure 21 a supporting structure in which is received a housing composed of plates 111 and 112 and an annular ring 113. These parts are assembled together to form a housing through which passes the shaft 114 carrying balancing member 115. Surrounding the balancing member 115 and received within the housing is an annular balancing member 116.

Annular balancing member 116 is provided with a plurality of balancing zones or areas 117 between which are isolating grooves 118, feed grooves 119 and reduction grooves 120. Around the exterior of the annular balancing member 116 are provided a plurality of grooves 121 which are adapted to be closed by the annular member 113 so as to form passages for fluid extending about the periphery of annular balancing member 116.

Balancing member 115, as best seen in Figure 20, has a plurality of balancing zones or areas 122 partly surrounded by isolating grooves 123. Intermediate each balancing zone 122 are a plurality of grooves comprising the feed grooves 124 and reduction grooves 125. Due to space restrictions reduction grooves 125 must necessarily be short and in order to provide for large capacity flow of fluid I provide a plurality, and in the embodiment illustrated three such reduction grooves for each balancing zone. Balancing member 115 is provided with passages 126 which interconnect each reduction groove 125 with the balancing zone 122 directly opposite to the reduction groove.

Annular member 113 is provided with a passage 130 for admitting fluid under pressure to the balancing systems. A ring 131 is applied to the annular member 113 in tightly sealed relation and is provided with passage 132 which communicates with an annular groove in member 113 connecting passages 130.

Passages 130 communicate with a groove 133 extending about the periphery of annular balancing member 116 and fluid is admitted through passages 134 to the feed grooves 119 at the inner surface of the annular balancing member 116. The groove 133 communicates through another passage 135 to a groove 136 which communicates with all of the feed grooves 124 previously referred to.

The flow of fluid from the balancing areas 117 and 122 is through an outlet passage 137 communicating with an annular groove 138 in balancing member 116; and from a passage 139 in plate 112, the passage 139 being in communication with an annular isolating groove 140 to which all of the isolating grooves 123 previously referred to connect.

Since each of the reduction grooves 125 communicates with a balancing area 122 directly opposite to the reduction groove, the arrangement provides for balancing-out loads tending to disturb the alignment of the shaft 114 in its supporting structure.

The operation of the structure illustrated in Figures 20 and 21 is similar to that described in the previous embodiments and will not be described in detail.

In the foregoing described embodiments of my invention the arrangement of balancing areas is symmetrical, but it will be appreciated that in some cases it may be desirable to provide a non-symmetrical arrangement. Thus for example, where a rotary shaft is to be supported against loads applied vertically downward thereon and in which there is a fixed preloading, due perhaps to the weight of permanently attached machine elements, it may be desirable to provide relatively larger balancing zones or areas around the lower half of the structure as compared to the size of the balancing zones or areas located around the upper half of the structure. By an arrangement such as this, it will be possible if desired to position the shaft under its constant preloading as closely adjacent to the center of the clearance provided as may be desired. In other cases it may even be desirable to provide the pressure areas of such relative size and number as to position the float member adjacent the upper side of its clearance before external loading is applied.

The bearings of the type disclosed herein can be produced in units which are dimensionally interchangeable with commercial ball and roller bearings, and they can be produced, in addition, in forms not feasible in ball or roller bearings. Some examples are:

1. Spherical bearings or units for universal movement, with load capacity for all angles.
2. Cylindrical bearings or units for radial loads and combined rotary and axial movement.
3. Flat bearings for thrust loads in both directions and combined rotary and universal movement in a plane.
4. Units designed for application to reciprocating machine elements such as machine tables, slides, splines, etc.
5. Nut type bearing units for large threads of any form.
6. Coupling units for limited universal movement, but arranged for positive angular drive.
7. Bearing units in any of the above types which are split or arranged in sections for assembly purposes.

Since the relative movable members, where my novel system is employed, never touch each other, wear can take place only if one or more of the following conditions obtain:

1. Liquid or gas fed to bearings which will chemically attack material used in bearing members.

2. Pressure of fluid supplied to bearing fails or becomes subnormal resulting in direct contact of the bearing faces while bearing is in operation at appreciable load and speed.

3. The bearing is improperly designed or viscosity of liquid is too low resulting in extreme flow velocities through clearance restrictions causing excessive turbulence which can result in fluid impact erosion.

4. The fluid fed to bearing faces is insufficiently filtered resulting in the abrasion of bearing surfaces by hard solid particles larger, in one or more dimensions, than the minimum radial bearing clearance.

Since all of these possibilities of wear can be completely avoided by simple time tested means, the result can be practically unlimited bearing life under maximum rated load and speed.

Attention is particularly directed to the fact that the floating bearing member is supported and located by bodies of fluid (either liquid or gas) and not by films of only microscopic thickness.

In bearings of the type employed prior to my invention, the bearing itself is required to perform the functions of both a bearing and a hydraulic pump in order to build up in part the hydraulic pressure required. Since this type of pumping means is perhaps the most inefficient method of pumping fluids to high pressures, an excessive amount of work is converted into heat to the detriment of both the bearing and pumping functions. Bearings of the type referred to will only function on certain viscous liquids known as lubricating oils, and even on these specially developed liquids the film thickness dwindles to approximately four millionths (.000004) of an inch in thickness to develop a unit film pressure of approximately 2000 pounds per square inch; with bearing members running so close, surface finish and contour would need to be practically perfect to prevent irregularities of over .000004 of an inch from dragging against its mating surface, thus creating additional heat.

In bearings of the type disclosed herein the depth of the fluid bodies supporting the load is not limited to even tenths of an inch. The complementary fitted surfaces (which are designed to function primarily as automatically variable valving orifices or restrictions) are always separated by a predetermined distance in the order of a few ten-thousandths of an inch up to a few thousandths of an inch. Thus surface irregularities, contour irregularities, and deflection of bearing members under load can be many times greater without causing portions of the bearing surfaces to drag and generate heat.

Furthermore, the continuous flow or oozing of fluid through my improved bearing is so nearly equal at all points that all portions of all bearing surfaces run at the temperature of the fluid, which may be kept as low as desired.

With my improved type of bearing, regardless of whether or not the bearing is in motion or loaded, the bearing members are positively separated by bodies of fluid under pressures, the supply of which is externally generated by efficient pumping means. Thus there can be no starting drag or wear which in plain bearings occurs at speeds too low to maintain sufficient oil film pressure.

Since my improved bearings are not lubricated by a liquid film of microscopic (or in some cases zero) thickness, but deep bodies of fluid continuously maintained and supplied at or above the required minimum pressure, any liquid or gas which does not chemically attack the bearing materials chosen, may be used. The maximum load carrying capacity of my improved bearing is not altered by the kind of fluid used if the same fluid pressure is used in all cases.

The load carried by my improved bearings is determined by the fluid pressure supplied and by the effective areas subjected to the balancing pressure. The maximum unit load employed in the best plain bearings is in the order of 2000 pounds per square inch, but no such limits exist in the case of my improved bearings.

My improved bearings have zero "shake" or backlash. It is noted, however, that the floating member will yield under load a maximum of approximately 90% of the radial clearance under full rated load. It will be appreciated that the degree of yield under a given load is inversely proportional to the fluid pressure employed in a given bearing.

In designing a bearing for a particular application the balancing areas or zones and the various grooves referred to are usually located in that member which supports the load more nearly continuously on the same portion of its bearing surface. In this manner each individual balancing area functions more nearly continuously at the same fluid pressure. Thus cyclic changes from maximum to minimum pressure are avoided with the following advantages:

1. If liquid is fed to the bearing a slight reduction in flow through the bearing will result.

2. If gas is fed to the bearing a considerable reduction in flow to the bearing will result.

3. The clearances on opposite sides of the floating member will not vary under constant load conditions at any point in the cycle.

4. The flow of fluid through the bearing will not increase with increase in bearing speed.

My improved bearing may be operated at any speeds, however great, at which the centrifugal force will not distort or rupture the rotating member. They are free of vibration and therefore silent at all speeds and loads. Since the complementary bearing surfaces bear only on a body of fluid and never against each other while in operation, the materials may be selected for structural and processing considerations primarily. My improved bearings require neither a run-in nor a warm-up period before the application of rated load at rated speed.

In practicing the invention it is recommended as a precautionary measure that some means be employed to protect the bearings against insufficient fluid pressure at all times. Conventional or special automatic pressure responsive start-and-stop means might well be employed for this purpose, such, for example, as the means shown in Patent No. 2,160,778 issued May 30, 1939. When such means is present the bearings will thus be in fluid suspension before they start working.

My improved bearings will have many diverse fields of application and I call attention to a number of typical applications:

1. All important bearing, including pistons, of internal combustion and steam engines.

2. All important bearings of all types of turbines.

3. Marine propeller shaft bearings.

4. Machine work table or bed ways.

5. Work spindles of milling machines, drill presses, lathes, boring spindles, grinding spindles, grinders, automatics and numerous other types.

6. Electric motor and generator bearings.

7. All important bearings of air compressors and motors including pistons.

8. All important bearings of hydraulic pumps and motors.

9. For positively balancing flat, cylindrical and other types of valves in hydraulic equipment of all types.

10. Gyroscope bearings.

11. To replace knife edges in large scales and weighing devices of many types.

12. To replace delicate pivots and knife edges in instruments of many types.

13. Large couplings, universal joints, slip splines, threads of screw jacks, etc.

14. For rolls required in steel rolling mills.

15. Deep well drilling equipment.

16. Centrifugal pumps of all types.

17. Dredge cutter shaft bearings and dredge pump bearings.

18. Any machines in which oil can not or should not be used.

Due to the absence of rolling contact and vibration there is practically zero tendency for members to creep. In my improved bearings vibration cannot originate on the bearing surfaces, and any vibration set up elsewhere in the mechanism will be damped-out, at least in part, by the dash pot action of the fluid bodies on which the floating member is supported. Impact loads are likewise softened.

Dependable ratings may readily be computed for my improved bearings much more accurately than for previously known types. With the balancing areas and fluid pressures known, simple arithmetic only is required to determine the maximum safe working load. Bearing life need not be considered in the rating.

When the grooves and balancing areas are located in the fixed member, a pressure gauge can be connected through ducts to each balancing area. Under no load condition the reading of all gauges will be identical but when loaded the balancing areas opposing the load will show an increase in pressure, and those opposite will show a corresponding decrease in pressure. The difference in pressure of any opposite pair of balancing areas will show the pounds bearing load at the angle of the reference balancing area.

Due to the fact that there is a continuous flow of fluid through the bearing it is practically impossible for dirt and foreign particles to find direct entrance into my improved bearings. The oil supplied under pressure will of course be filtered to prevent the introduction of dirt and foreign particles at that point.

It will be noted that if a fluid pressure considerably in excess of the minimum required is employed, there will be no effect except to space the floating member more nearly in the position at which the clearance at opposite sides is identical. However, since more fluid will ooze through the bearing with increased pressure, and since work must necessarily be done in pumping fluid under pressure, a slight decrease in overall efficiency will result from the use of excess pressure.

In some cases somewhat closer tolerances with respect to clearance control is required as compared to plain bearings. The tolerances on surface finish, however, need not be as close. In comparison with ball or roller bearings the tolerances are fewer in number and not nearly as close.

It is desired to particularly emphasize the fact that while my improved bearing calls for a slight displacement of the floating member in order to effect changes in balancing pressure, the bearing is nevertheless well adapted for precision machines. In precision machines the loads are relatively light compared to the size of the bearings employed and if in addition, relatively high fluid pressures are employed together with slightly less than normal bearing clearance, the bearings can be centered in their clearances as rigidly as desired. Furthermore, with my improved bearing there is no friction or temperature problem, no speed problem, no vibration problem, no deterioration problem, no warm up period, no condensation problem, no abrasive dirt problem, and no deflection or bearing alignment problem.

The depth, size, and contour of the feed grooves, reduction grooves, isolating grooves and balancing areas are not at all critical. Small variations simply impose small hydraulic loads which are automatically balanced out by small variations in fluid pressure of the various balancing areas, exactly as in the case of applied external load.

In proportioning a bearing of the type disclosed herein for a particular application in which the load is known, the fluid pressure is determined by the area available for balancing. Thus if the balancing area can be doubled, the pressure can be halved. The clearance between the bearing members is dependent largely on bearing size and the amount of deformation from loading, temperature variations etc. In general, the larger the diameter the greater the clearance, but there are many exceptions to this. The minimum safe clearance is usually used in order to keep the fluid pump capacity as low as possible. The viscosity of the fluid used is dependent largely on the clearance. There are many exceptions in the case of water bearings of many sizes, and air and steam bearings of many sizes, etc.

The length of "seals" between the feed grooves and the reduction grooves, and between the pressure areas and the isolating grooves is dependent largely on the bearing size. For large size bearings in which the clearance is necessarily relatively large, the length of "seals" between these areas are increased an amount necessary to offset the effect of increased clearance on fluid flow through the bearing. All bearing factors including fluid flow can be exactly predetermined in the light of current knowledge of the leakage of various fluids through various clearances at various pressures and temperatures.

While I have illustrated and described a number of specially different modifications illustrating applications of my improved automatic fluid pressure balancing system, it will be appreciated that this specific disclosure is not intended to be limiting but is made merely to enable those skilled in the art to practice my invention, whether in applications similar to those illustrated or in applications widely differing therefrom but employing the same basic principles, and the scope of my invention is indicated by the appended claims.

What I claim as my invention is:

1. A device comprising relatively rotatable inner and outer members spaced from and bodily radially movable relative to each other, said members having their opposed surfaces cooperating to form a plurality of circumferentially spaced areas and other areas intermediate and of smaller size than said first mentioned areas, said first and second mentioned areas being arranged in pairs with each pair comprising an area of larger size and an associated area of smaller size on opposides of said inner member, one of said members having means for conducting fluid under pressure to each of the areas of smaller size, one of said members having additional means independent of said first mentioned means for conducting fluid from each of the areas of smaller size to the associated areas of larger size, and one of said members having outlet means for conducting fluid from each of the areas of larger size, said opposed surfaces of said members variably controlling the flow of fluid to the areas of smaller size and from the areas of larger size in accordance with relative bodily radial movement of said members.

2. A device comprising relatively bodily movable inner and outer members having pairs of spaced surface portions at opposite sides of said inner member provided with fluid outlet means defining different sized pressure areas at the opposite sides of said inner member and also provided with recesses forming parts of the areas and spaced from said outlet means, one of said members being provided with inlet means for conducting fluid under pressure to the smaller area, said inlet means opening into the smaller area between and spaced from the recess and the outlet means of the smaller area, one of said members being provided with additional means independent of said outlet and inlet means for conducting fluid from the recess of the smaller area to the recess of the larger area, said members being relatively bodily movable in a direction to simultaneously increase and decrease the spacing between the surface portions at the opposite sides to regulate the fluid pressure in the areas.

3. A device comprising relatively rotatable inner and outer members having spaced surfaces and bodily movable relative to each other, one of said members being provided with fluid outlet means defining circumferentially spaced alternate pressure areas of larger and smaller size, one of said members being provided with a recess forming a part of each area and spaced from said outlet means, said larger and smaller areas being arranged in pairs with each pair comprising a larger area and a smaller area at opposite sides of said inner member, one of said members being provided with inlet means for conducting fluid under pressure to each of said smaller areas, said inlet means opening into each of said smaller areas between and spaced from the recess and the outlet means of each smaller area, one of said members being provided with additional means independent of said outlet and inlet means for conducting fluid from the recess of each of said smaller areas to the recess of each of the associated larger areas, the relative bodily movement of said members controlling the spacing of the surfaces of said members to regulate the fluid pressure in said larger and smaller areas.

4. A device comprising inner and outer members bodily movable relative to each other, said members having opposed surface portions forming a plurality of different sized pressure areas on each of the opposite sides of said inner member, said areas being arranged in pairs with each pair comprising an area of larger size and an associated area of smaller size on the opposite sides of said inner member, one of said members being provided with a recess forming a part of each area, one of said members being provided with inlet means for conducting fluid under pressure to each of said smaller areas, said inlet means opening into each of said smaller areas at a distance from the recesses of the smaller areas, one of said members being provided with additional means independent of said inlet means for conducting fluid from the recess of each of the smaller area to the recess of each of the associated larger areas and one of said members having outlet means for conducting fluid from each of said larger areas, said outlet means being located between the smaller and larger areas and spaced from the recesses thereof on each of the opposite sides of said inner member, said opposed surface portions of said members variably controlling the flow of fluid to said smaller areas and from said larger areas in accordance with relative bodily movement of said members to cause variation in the spacing between said opposed surface portion.

5. A device comprising relatively rotatable inner and outer members having spaced surfaces and bodily radially movable relative to each other, said outer member being provided with fluid outlet means defining circumferentially spaced alternate pressure areas of larger and smaller size, said outer member being provided with a recess forming a part of each area and spaced from said outlet means, said larger and smaller areas being arranged in pairs with each pair comprising a larger area and a smaller area at opposite sides of said inner member, said outer member being provided with inlet means for conducting fluid under pressure to each of said smaller areas, said inlet means opening into each of said smaller areas between and spaced from the recess and the outlet means of each smaller area, said outer member also being provided with additional means independent of said outlet and inlet means for conducting fluid from the recess of each of said smaller areas to the recess of each of the associated larger areas, the relative bodily radial movement of said members controlling the spacing of the surfaces of said members to regulate the fluid pressure in said larger and smaller areas.

6. A device comprising relatively movable inner and outer members having generally spherical opposed surfaces cooperating to form axially spaced sets of circumferentially spaced areas and other areas intermediate and of smaller size than said first mentioned areas, said areas being arranged in pairs with each pair comprising a larger area of one set and an associated smaller area of the other set located on opposite sides of said inner member, said outer member having means for conducting fluid under pressure to each of said smaller areas, said outer member also having additional means independent of and spaced from said first mentioned means for conducting fluid from each of said smaller areas to the associated larger areas, said outer member further having outlet means independent of and spaced from said first and second mentioned conducting means for conducting fluid from each of said larger areas, said opposed generally spherical surfaces of said members variably controlling the flow of fluid to said smaller areas and from said larger areas in accordance with relative bodily movement of said members.

7. A device comprising an outer member having a bore of generally circular cross section, an inner member in said bore of slightly smaller generally circular cross section, said members being relatively movable laterally with respect to each other, the inner surface of said outer member and the outer surface of said inner member cooperating to control the flow and pressure of fluid flowing between said surfaces from a source of pressure to exhaust, one of said surfaces being substantially smooth and uninterrupted, the other of said surfaces shaped to provide in cooperation with said smooth surface a plurality of fluid pressure balancing systems, each of said systems comprising a relatively large balancing recess formed in said other surface, a relatively small reduction recess formed in said other surface substantially diametrically opposite to said first recess, a relatively small supply recess closely spaced from said reduction recess, a fluid passage of constant cross section interconnecting said reduction and balancing recess, and means for introducing fluid under pressure to said supply recess, the spacing between said surfaces serving to variably restrict flow of fluid from said supply recess to said reduction recess, and from said balancing recess to exhaust, and an isolating groove in said other surface open to exhaust and partially surrounding said balancing recess to limit the area over which fluid pressure in said recess is effective.

8. A device comprising a member having a cylindrical bore, an inner member having a cylindrical surface received in said bore and relatively movable laterally therein to vary the spacing between said surfaces, one of said surfaces being smooth, the other of said surfaces being interrupted to form circumferentially spaced, alternate, relatively large and relatively small variable pressure areas, the interruptions in said other surface comprising fluid outlet grooves open to exhaust and forming the boundary between adjacent pressure areas, balancing recesses formed in the relatively large pressure areas, spaced feed and reduction recesses formed in said relatively small pressure areas, said feed recesses being open to a source of fluid under pressure, and passages of constant capacity interconnecting each of said reduction recesses with a balancing recess diametrically opposite thereto.

9. A device comprising an outer member having a generally cylindrical bore, an inner generally cylindrical member in said bore, the inner and outer surfaces of said members being of a size to permit slight relative lateral movement of said members, one of said members having sequentially formed in its generally cylindrical surface in repeating circumferentially spaced relation, an outlet groove, a feed groove and adjacent reduction recess, an outlet groove, and a balancing recess, and a passage connecting each of said reduction recesses with a balancing recess substantially diametrically opposite thereto.

10. Bearing structure for a rotary part comprising a member having an opening for receiving said part therein, the inner surface of said opening having a plurality of spaced balancing recesses therein, outlet grooves at least partly surrounding said recesses, relatively small reduction recesses intermediate said balancing recesses, inlet means opening into the said surface adjacent said reduction recesses, and passages extending circumferentially around said member and connecting each of said balancing recesses with a diametrically opposite reduction recess.

11. Bearing structure for a rotary part comprising a member having an opening for receiving said part therein, the inner surface of said opening having a plurality of spaced balancing recesses therein, outlet grooves at least partly surrounding said recesses, relatively small reduction recesses intermediate said balancing recesses, a pair of inlet recesses adjacent to but spaced circumferentially from each of said reduction recesses, and passages extending circumferentially around said member and connecting each of said balancing recesses with a diametrically opposite reduction recess.

12. A device comprising a support having a bore defining an inner cylindrical surface, a member in said bore having an outer cylindrical surface laterally movable in said bore, fluid supply control means comprising sets of fluid inlets opening into one of said surfaces and reduction recesses adjacent to said inlets to receive a flow of fluid therefrom variably restricted in accordance with the spacing between said surfaces, relatively large balancing recesses formed in said one surface, passages interconnecting each of said reduction recesses with a diametrically opposite balancing recess, and grooves in said one surface intermediate each balancing recess and the adjacent inlets and reduction recesses providing outlets from said balancing recesses which are variably restricted in accordance with the spacing between said surfaces.

13. A device for supporting a rotary shaft having a smooth cylindrical outer surface comprising a body provided with a cylindrical bore, an annular bearing element insertable in said bore and adapted to receive and form a bearing for a rotary shaft, said bearing element having a bore defining an inner cylindrical surface, fluid supply control means comprising fluid inlets opening into the inner surface of said bearing element, reduction recesses adjacent to said inlets to receive a flow of fluid therefrom variably restricted in accordance with the spacing between the surface of said bearing element and the adjacent surface of the shaft supported thereby, relatively large balancing recesses formed in the inner surface of said bearing element, passages interconnecting each of said reduction recesses with a diametrically opposite balancing recess, and grooves in the inner surface of said bearing element intermediate each balancing recess and the adjacent inlets and reduction recesses providing outlets from said balancing recesses which are variably restricted in accordance with the spacing between the inner surface of said bearing element and the adjacent surface of the shaft carried thereby.

14. A device for supporting a rotary shaft having a smooth cylindrical outer surface comprising a body provided with a cylindrical bore, an annular bearing element insertable in said bore and adapted to receive and form a bearing for a rotary shaft, said bearing element being dimensionally interchangeable with ball or roller type bearing assemblies, said bearing element having a bore defining an inner cylindrical surface, fluid supply control means comprising fluid inlets opening into the inner surface of said bearing element, reduction recesses adjacent to said inlets to receive a flow of fluid therefrom variably restricted in accordance with the spacing between the surface of said bearing element and the adjacent surface of the shaft supported thereby, relatively large balancing recesses formed in the inner surface of said bearing element, passages interconnecting each of said reduction recesses with a diametrically opposite balancing recess, and grooves in the inner surface of said bearing element intermediate each balancing recess and the adjacent inlets and reduction recesses providing outlets from said balancing recesses which are variably restricted in accordance with the spacing between the inner surface of said bearing element and the adjacent surface of the shaft carried thereby.

15. A device comprising a support having a bore defining an inner cylindrical surface, a member in said bore having an outer cylindrical surface laterally movable in said bore, fluid supply control means comprising sets of fluid inlets opening into one of said surfaces and reduction recesses adjacent to said inlets to receive a flow of fluid therefrom variably restricted in accordance with the spacing between said surfaces, relatively large balancing recesses formed in said one surface alternated between and in circumferential alignment with said sets of inlets and reduction recesses, passages interconnecting each of said reduction recesses with a diametrically opposite balancing recess, and grooves in said one surface intermediate each balancing recess and the adjacent inlets and reduction recesses providing outlets from said balancing recesses which arer variably restricted in accordance with the spacing between said surfaces.

FRANK W. HOFFER.

REFERENCES CITED

The following references are of record in the file of this patent:

UNITED STATES PATENTS

| Number | Name | Date |
|---|---|---|
| 585,445 | Lumb | June 29, 1897 |
| 603,260 | Cook | May 3, 1898 |
| 692,982 | Capewell | Feb. 11, 1902 |
| 846,796 | Kruesi | Mar. 12, 1907 |
| 846,927 | Lasche | May 12, 1907 |
| 1,906,715 | Penick | May 2, 1933 |
| 2,049,343 | Warren | July 28, 1936 |
| 2,155,455 | Thoma | Apr. 25, 1939 |
| 2,160,778 | Dall | May 30, 1939 |
| 2,205,913 | Stacy | June 25, 1940 |

FOREIGN PATENTS

| Number | Country | Date |
|---|---|---|
| 44,229 | Denmark | Apr. 18, 1929 |
| 180,897 | Germany | Feb. 27, 1906 |
| 379,062 | Great Britain | Aug. 25, 1932 |